(No Model.)

F. GRINNELL.
LOCKED JOINT FOR FIRE APPARATUS.

No. 432,403. Patented July 15, 1890.

WITNESSES:
N. L. Hayes
C. L. Haynes

INVENTOR:
Frederick Grinnell
by Bentley & Knight
ATTYS.

UNITED STATES PATENT OFFICE.

FREDERICK GRINNELL, OF PROVIDENCE, RHODE ISLAND.

LOCKED JOINT FOR FIRE APPARATUS.

SPECIFICATION forming part of Letters Patent No. 432,403, dated July 15, 1890.

Application filed February 19, 1890. Serial No. 341,044. (No model.)

*To all whom it may concern:*

Be it known that I, FREDERICK GRINNELL, of Providence, in the county of Providence and State of Rhode Island, have invented a certain new and useful Improvement in Locked Joint for Fire Apparatus, of which the following is a specification.

In the protection of buildings by automatic mechanism it is customary to employ a restraining device, consisting of two or more parts held together by solder or other heat-actuated device, that will upon the occurrence of an abnormal rise of temperature allow the parts of the restraining device to separate and permit the restrained force to perform its function. Such restraining devices may be used in automatic fire-extinguishers to hold the valves to their seats and prevent the escape of water until a fire occurs in their vicinity; or they may be used to control alarm mechanisms, close doors, set pumps in action, or perform any similar function.

In Patent No. 277,479, granted to me on May 15, 1883, I have shown a heat-actuated locked joint consisting of two parts combined with a key placed so as to hold the parts together, the key being constructed to be released by the action of heat and permit the parts to separate.

My present invention relates to this class of devices; and it consists in a locked joint having certain special features of construction, hereinafter set forth and claimed.

Figure 1:
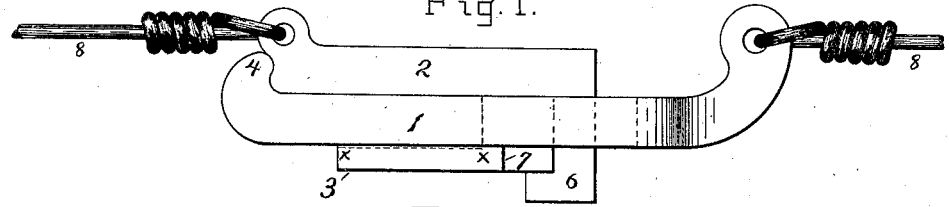
Figure 2:
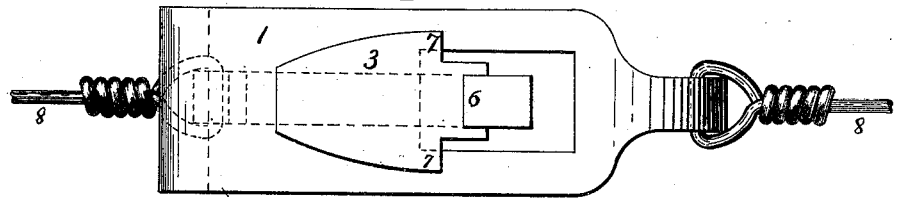
Figure 3:
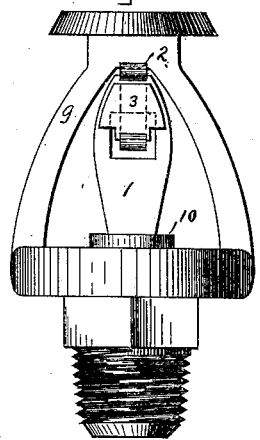
Figure 4:
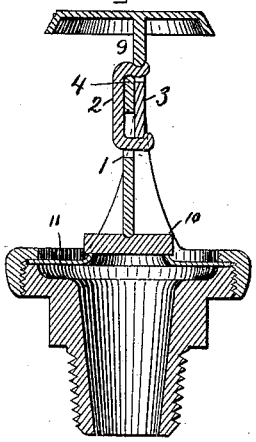
Figure 5:
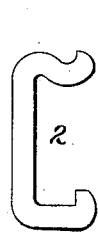
Figure 6:
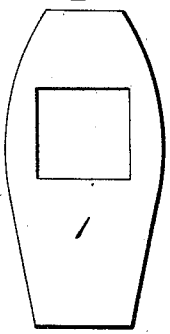
Figure 7:
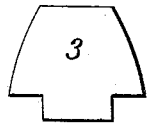

In the accompanying drawings, Figures 1 and 2 represent, respectively, top and side views of a locked joint, showing my invention applied to a tension cord or wire. Fig. 3 is a side view of an automatic fire-extinguisher, showing the invention applied to a strut for holding the valve closed. Fig. 4 is a sectional view of the same in a plane at right angles to that of Fig. 3. Figs. 5, 6, and 7 show the parts of the joint separately; and Fig. 8 shows the device illustrated in Figs. 3 and 4, with the joint released and the valve opening.

The joint consists, essentially, of three parts, 1, 2, and 3. The part 1, I call the "plate," the part 2 the "hook," and the part 3 the "key;" but these terms are used simply as names and should not be considered as limiting my invention to the particular forms shown. The plate 1 has a projecting portion 4, which forms an abutment, against which the heel 5 of the hook 2 has a pivotal bearing. The hook 2 has a hooked portion 6, which passes through a slot in the plate, and is locked in position by engaging over the end of the key 3. The key 3 is soldered to the plate along the surface *x x*, as indicated by the dotted line, and the hook 2 may also be secured to the plate by solder, so that the parts will not become dislocated until released by heat. The key, instead of being constructed so as to turn or slide over an edge, as heretofore, is provided with projections 7, overlapping the edges of the slot, so that when the solder is melted and the hook pulling on the key tends to turn it the key will turn on its own edge instead of on the edge of the plate. The key, therefore, cannot be dragged after the hook, but must be immediately released. As a matter of fact, after the key has been turned through a certain angle it is forced to slide along the surface of the plate, being, so to speak, wedged out of the way by the hook. By means of this construction I am able to obtain any desired amount of leverage, for it will be seen that the edge of the hook that bears on the key may be brought very near to the edge of the key that bears on the plate. This distance may, in fact, be much less than the thickness of the key, which is a desirable feature, for otherwise the key would have to be so thin to obtain the desired leverage that it would not have sufficient strength. It will be seen that this advantage would not be present if the key had its bearing when turning against the edge of the plate.

The locked joint may be placed between the two ends of a tension wire or cord 8, which may be used to control an alarm, a fire-door, a pump-valve, or other fire apparatus.

Figure 8:
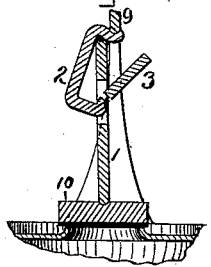

In Figs. 3, 4, and 8, I have shown my improved joint applied to an automatic fire-extinguisher. In this case the joint takes a thrust strain, the hook having a pivotal bearing against the arch 9 of the extinguisher instead of the wire-connection. The plate 1 forms an abutment at 4, upon which the hook is fulcrumed, the other end of the plate bearing against the valve 10, so as to hold it forcibly to its seat on the flexible diaphragm 11.

Fig. 8 illustrates the manner in which the key is forcibly ejected by the hook, showing how slight a movement of the valve is sufficient to not only rupture the soldered joint, but to also free the hook from the locking-key.

What I claim as new, and desire to secure by Letters Patent, is—

1. In a locked joint adapted to be released by heat, the combination of the plate 1, the hook 2, and the key 3, the key locking the hook to the plate, and having a laterally-projecting edge, as 7, adapted to turn against the flat surface of the plate, substantially as and for the purpose set forth.

2. In a locked joint adapted to be released by heat, the combination of the plate 1, the hook 2, abutting against the plate, and a key 3, locking the hook to the plate, the key being held to the plate by fusible solder, and having a laterally-projecting edge adapted to turn against and slide along the flat surface of the plate, substantially as and for the purpose set forth.

FREDERICK GRINNELL.

Witnesses:
FREDERICK W. HARTWELL,
WM. L. PHILLIPS.